(12) United States Patent
Tsvi et al.

(10) Patent No.: US 8,103,631 B2
(45) Date of Patent: Jan. 24, 2012

(54) MERGING FILES ON STORAGE AND RETRIEVE

(75) Inventors: Yaakov Ben Tsvi, Ramat Hasharon (IL); Ittai Golde, Rishon Lezion (IL); Judah Gamliel Hahn, Ofra (IL)

(73) Assignee: Sandisk IL Ltd, Kfar Saba (IL)

( * ) Notice: Subject to any disclaimer, the term of this patent is extended or adjusted under 35 U.S.C. 154(b) by 377 days.

(21) Appl. No.: 12/274,145

(22) Filed: Nov. 19, 2008

(65) Prior Publication Data

US 2010/0125591 A1    May 20, 2010

(51) Int. Cl.
*G06F 7/00* (2006.01)
*G06F 17/00* (2006.01)

(52) U.S. Cl. ......... 707/640; 707/661; 709/203; 709/231

(58) Field of Classification Search .......... 707/640, 707/647, 661, 673; 709/203, 227, 231
See application file for complete search history.

(56) References Cited

U.S. PATENT DOCUMENTS

| | | | |
|---|---|---|---|
| 5,517,892 A * | 5/1996 | Fujimori | 84/462 |
| 5,961,600 A * | 10/1999 | Ono et al. | 709/228 |
| 6,810,405 B1 * | 10/2004 | LaRue et al. | 707/613 |
| 7,275,140 B2 | 9/2007 | Paley | |
| 7,349,976 B1 * | 3/2008 | Glaser et al. | 709/231 |
| 7,917,719 B2 | 3/2011 | Elhamias et al. | |
| 7,925,781 B1 * | 4/2011 | Chan et al. | 709/238 |
| 7,930,585 B2 | 4/2011 | Bychkov et al. | |
| 7,945,759 B2 | 5/2011 | Gorobets | |
| 2002/0093582 A1 * | 7/2002 | Aoki et al. | 348/333.02 |
| 2002/0184224 A1 * | 12/2002 | Haff et al. | 707/10 |
| 2004/0003103 A1 * | 1/2004 | Witt et al. | 709/231 |
| 2004/0049515 A1 * | 3/2004 | Haff et al. | 707/100 |
| 2005/0131961 A1 * | 6/2005 | Margolus et al. | 707/200 |
| 2007/0299930 A1 * | 12/2007 | Wendelrup et al. | 709/217 |
| 2008/0134163 A1 | 6/2008 | Golde et al. | |
| 2008/0307109 A1 * | 12/2008 | Galloway et al. | 709/232 |
| 2009/0024749 A1 * | 1/2009 | Harrang et al. | 709/228 |

* cited by examiner

*Primary Examiner* — Phong Nguyen
(74) *Attorney, Agent, or Firm* — Toler Law Group, PC

(57) ABSTRACT

A client designates and transfers a file to a server in distinct chunks. The number of data chunks equals the number of communication sessions that are required to complete the transfer of the designated file to the server, that number being dependent on the number of times the communication session between the client and the server is interrupted. If the designated file includes several concatenated client files, each chunk of the designated file may include one or more such client files. Each chunk of the designated file may include some part of a client file and one or more whole client files. The byte-wise size or length of a chunk depends on the duration of the related communication session: the longer a communication session, the larger the related chunk. By transferring the designated file to the server as distinctly recognizable chunks, the need to retransmit large files to the server is avoided.

20 Claims, 9 Drawing Sheets

MERGING FILES ON STORAGE AND RETRIEVE

FIELD OF THE INVENTION

The present invention generally relates to data transfers between a client and a server and more specifically to a client capable of transferring a large file to a server in an efficient way.

BACKGROUND

In online backup systems a client may concatenate many files into a single archive file and then upload the archive file as a whole to a remote backup server. In computers, an "archive file" might be a file that contains several compressed files, and a "client" might be an application or computer system that accesses a remote service on another computer system, known as a server, by using some communication network (e.g., the Internet).

A popular and simple way to transfer files, such as an archive file, from clients to backup servers is by using the Hypertext Transfer Protocol ("HTTP"). HTTP is a request/response communication standard that facilitates data transfers between a client and a server on the Internet. In the Internet environment a client is the end-user and the server is a website.

While every server used for backing up archive files supports standard HTTP/WebDAV commands such as "GET", "PUT" and "LIST", many servers do not support the byte-range feature that is required to resume failed data transfers. Thus, if a file (e.g., an archive file) transmitted from the client to the server is very large (e.g., at least in the order of megabytes) and the communication connection between the client and the server is interrupted or cut off during transmission, the entire file must be retransmitted at the next available opportunity, rather than transmitting only the portion of the file that has not yet been received by the server. This impedes using simple hosted web services as servers for online backup because sending a large file takes a considerable amount of time and requires computing resources. Therefore, the traditional requirement to retransmit the entire file only exacerbates this problem.

Hence, there is a need to address the problem of backing up files in a server in a way that would make the backing up process more efficient. For example, there is a need for a client that can send a large file to a server in a way that the client would not have to retransmit the entire file because of communication failures.

SUMMARY

It would, therefore, be beneficial to back up files in a server in a way that it will not be necessary to retransmit the files if the communication connection is interrupted in the middle of a file transfer. Various embodiments are designed to implement such capability, examples of which are provided herein. Various embodiments are designed to implement such files management, examples of which are provided herein. The following exemplary embodiments and aspects thereof are described and illustrated but are not intended to be exclusive or limiting in scope.

To address the foregoing, a file, which may include, contain, or be associated with one or more client files, is transferred from a client to a server using a communication session. If the communication session is interrupted before the file transfer is completed, the file is transferred to the server using additional one or more communication sessions, where each communication session is used to transfer a different chunk of the file. A "communication session", as used herein, necessitates establishing a communication channel between the client and the server and performing handshaking. In telecommunications "handshaking" is an automated process of negotiation that sets parameters of a communications channel that is established between two computer devices before normal communication over the channel begins. It follows the physical establishment of the channel and precedes normal information transfer. By "interruption" is meant herein any communication phenomenon that entails a new communication session.

Each chunk of the file that is transferred to the server during one of the communication sessions is transferred to the server as a file whose name is a unique variant of the file name of the file to be transferred to the server, and whose size depends on the amount of data transferred until the communication session is interrupted. That is, the longer a communication session is, the more data is transferred and the larger is the associated unique file.

If the first communication session is uninterrupted, the entire file is transferred from the client to the server as one chunk, that chunk being the largest chunk because it is at least as large as the transferred file. However, if additional communication sessions are required (i.e., due to communication interruptions), a first chunk of the file is transferred to the server using a first unique variant of the file name; a second chunk of the file is transferred to the server using a second unique variant of the file name; a third chunk of the transfer file is transferred to the server using a third unique variant of the file name, and so on.

By maintaining information that pertains to the chunks that have already been transferred to the server the client is capable of continuing to transfer to the server only untransferred chunks of the file. In other words, by making each chunk of the transferred file uniquely recognizable by both client and server (i.e., recognizable as a unique file), there is no need for the client to retransmit the entire file to the server if the communication connection there between is broken.

By "designating a file for transfer" is meant a process by which one or more files (designated herein below as files $f_1$, $f_2$, . . . , $f_k$) are transferred from a client to a server using a randomly changing number of files (also referred to herein below as "chunks") that are name-wise related because their file names share a common part which is referred to herein as a "common file name". The number of name-wise related files required to transfer the one or more files $f_1$, $f_2$, . . . , $f_k$ changes because each communication interruption causes an End-of-File ("EoF") to be generated and entails the generation of a new such file. The number of the name-wise related files is random because communication interruptions occur randomly. The name-wise related files are collectively called "designated file" because their file names are variants of a common file name. Transferring a designated file, therefore, means transferring the name-wise related files, or chunks. The file or files to be transferred from the client to the server (i.e., files $f_1$, $f_2$, . . . , $f_k$) may be transferred by using one or more chunks. That is, if a communication session is long enough the file or files $f_1$, $f_2$, . . . , $f_k$ can be transferred to the server as one chunk.

A method is provided for transferring data from a client to a server. The method may include a client designating a file for transfer to a server; establishing a communication session between the client and the server, and transferring the file to the server by using a unique variant of a file name of the file. If the communication session is interrupted before transfer of the file to the server is completed, the method may further include repeating the latter two steps (i.e., the steps of establishing a communication session between the client and the server, and transferring the file to the server by using a unique variant of a file name of the file) as many times as required for the file transfer to be completed.

The unique variant of the file name may include, for example, a unique suffix (e.g., ", . . . , part1"), a unique prefix (e.g., "part1, . . . ,"), or a file extension (e.g., ".part1") to the file name. The unique variant of the file name may include a unique sequential identifier. The unique sequential identifier may include an alphabetical, numeric, or alphanumeric index whose value is incremented for each time the latter two steps (i.e., the steps of establishing a communication session between the client and the server, and transferring the file to the server by using a unique variant of a file name of the file) are repeated, where, for each repetition, the client uses a different (i.e., unique) variant of the file name to transfer the rest or another chunk of the file to the server.

Repeating the latter two steps (i.e., the steps of establishing a communication session between the client and the server, and transferring the file to the server by using a unique variant of a file name of the file) may include using information to identify an offset from which transfer of the rest of the file should continue. The client may retrieve the information from the server each time before the two steps are repeated, or the information may be maintained and updated by the client. Alternatively, the client may retrieve some of the information from the server before the two steps are repeated and maintain and update the rest of the information locally (i.e., on the client).

The information may include a size of each chunk of the file that is transferred to the server during one of the communication sessions, and the offset may be derived from the sizes of the transferred chunks. The offset may be the sum of all the sizes of the transferred chunks or the sum of the sizes of the transferred chunks excluding the size of the chunk that was transferred to the server during a previous communication session. By "previous communication session" is meant a communication session preceding an interrupted communication session.

The method may further include assigning to a flag a repeating value (e.g., "1" or "REPEAT") or a non-repeating value (e.g., "0" or "NO_REPEAT") to respectively indicate to a retrieving client whether transferring the file to the server has been completed or not. The retrieving client may be the client or some other client. The flag may be assigned the repeating value before or during the first communication session and the non-repeating value after transfer of the file to the server is completed.

The file transferred to the server may be one file, for example it may be a 5.50-megabyte media file, or it may include k files $f_1, f_2, \ldots, f_k$ ($1 \leq k \leq n$) of the same type or of varying types. If a current communication session is interrupted during transfer of a particular one of the k files, which means that only part of the particular one of the k files has been transferred during the current communication session, the untransferred part of the particular one of the k files may be transferred to the server during the consecutive communication session, or, alternatively, the entire particular one of the k files may be retransferred to the server to make sure that the particular one of the k files has been successfully transferred to the server.

The method may further include sequentially retrieving the k transferred files from the server responsive to transferring the file name to the server (e.g., as a Uniform Resource Locator link). Alternatively, the client may retrieve the k files from the server as one concatenated file responsive to the client requesting the file from the server.

In another embodiment the method may include designating by the client k data objects for transfer to the server; associating a common file name (e.g., F) to the designated k data objects; establishing a communication session between the client and the server; and, while the communication session is uninterrupted, sequentially transferring data objects to the server, one data object after another, by using a unique variant of the file name (e.g., "F.part0"). If the communication session is interrupted, the method may include reestablishing the communication session and continuing to transfer untransferred data objects to the server by using, during each reestablished communication session, a different unique variant of the file name F. The process of reestablishing the communication session and continuing to transfer untransferred data objects is repeated until the last untransferred data object is transferred to the server. A data object may be or include one or more files $f_1, f_2, \ldots, f_k$, and/or data, and metadata related to one or more of files $f_1, f_2, \ldots, f_k$.

The designated file or k files may be transferred from the client to the server and retrieved from the server by using, for example, Hypertext Transfer Protocol ("HTTP").

A device with a client is provided for transferring data from the device to a server. The device may have all of the physical components (e.g., a memory, a storage controller, a processor and a communication interface) necessary for it to function as the client referred to above, and the various physical components may operatively interact with the processor and configured to perform the method described above. The device may have a client software application that may be stored on the memory. The client can be software/firmware that runs on the device, or it can replace the processor as a special-purpose processor that performs the functions described herein.

In addition to the exemplary aspects and embodiments described above, further aspects and embodiments will become apparent by reference to the figures and by study of the following detailed description.

BRIEF DESCRIPTION OF THE DRAWINGS

Various exemplary embodiments are illustrated in the accompanying figures with the intent that these examples not be restrictive. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. Of the accompanying figures.

DETAILED DESCRIPTION

The description that follows provides various details of exemplary embodiments. However, this description is not intended to limit the scope of the claims but instead to explain various principles of the invention and the manner of practicing it.

In order to address the problem of interrupted communication between a client and a server and related issues, a client designates and transfers a file to a server (e.g., for back up) in distinctly recognizable chunks, the number of which depends on the number of the communication interruptions. For example, if there are no interruptions, the designated file is transferred as one chunk; if there is one interruption the designated file is transferred in two chunks, and so on. If the designated file involves transferring several concatenated client files, each chunk of the designated file may include one or more such client files. Each chunk of the designated file may include some part of a client file and one or more whole client files. For example, a first chunk of the designated file may include a client file $f_1$; a second chunk of the designated file may include a client file $f_2$ and 30% of a client file $f_3$; a third chunk of the designated file may include the rest (i.e., 70%) of client file $f_3$ and client files $f_4$ and $f_5$, and so on.

The number of data chunks equals the number of communication sessions that are required to complete the transfer of the designated file to the server, that number being dependent on the number of times the communication session between the client and the server is interrupted. The byte-wise size or length of a file's chunk depends on the duration of the related communication session. By transferring the designated file to the server as distinctly recognizable chunks, the need to retransmit large files to the server is avoided. The way a designated file or a group of client files are transferred to a server in one or more chunks, and the way the client-server communication sessions affect the number and sizes of the file's chunks are described herein below.

Figure 1A:
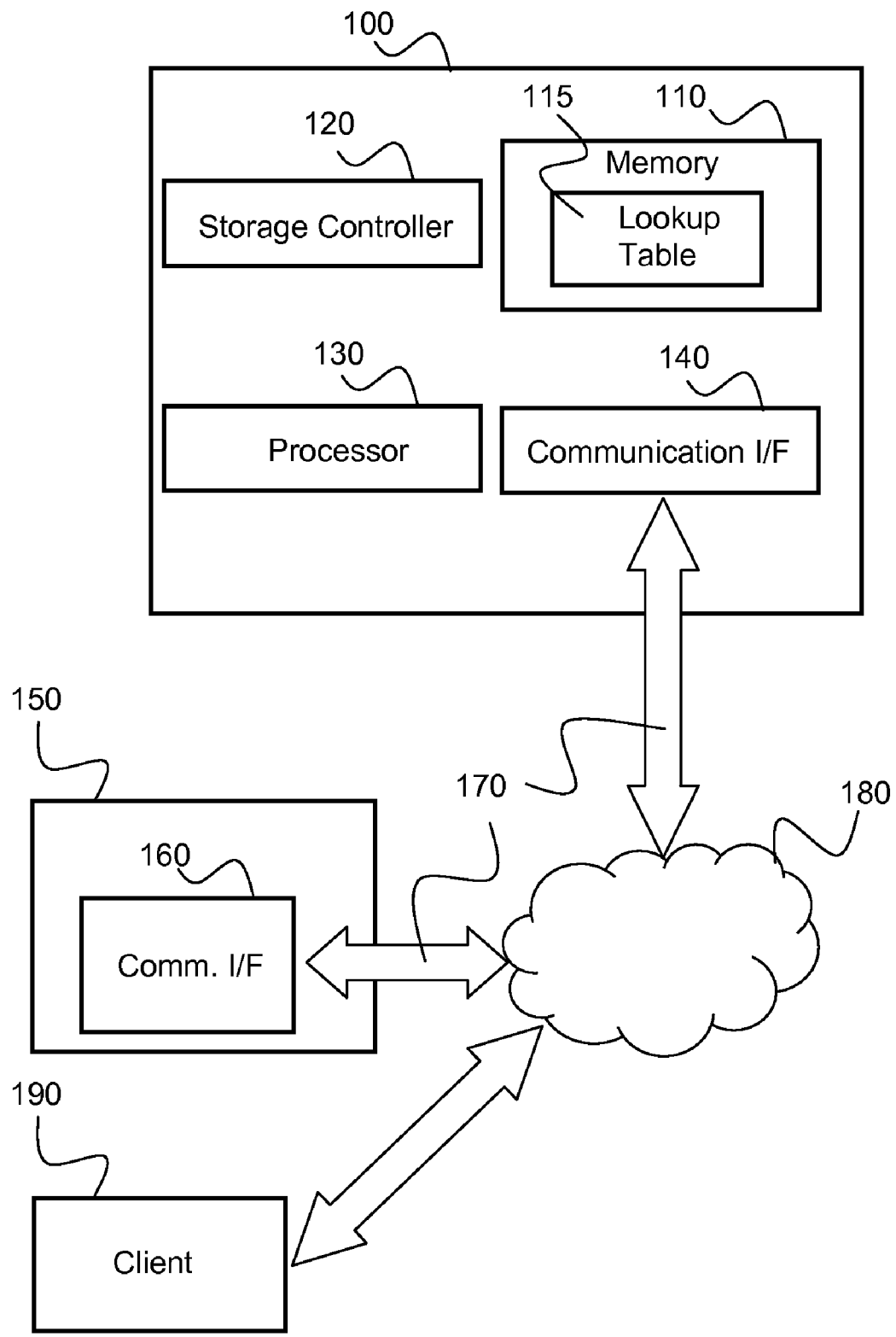
FIG. 1A is a block diagram of a client-server environment according to an example embodiment.

FIG. 1A is a block diagram of a client 100 according to an example embodiment. Client 100 may include a memory 110, a storage controller 120 for managing transfer of data files to and from memory 110, and a processor 130.

Memory 110 may hold one or more client files (not shown in FIG. 1A) that need, or are required, to be transmitted to a remote computer system, for example to server 150, for back up. As explained above, client 100 may transfer the one or more client files to server 150 as one file that may be transferred to server 150 as a whole (i.e., in one chunk) or in chunks; i.e., depending on whether there are interruptions in the communication between client 100 and server 150.

If, due to communication interruptions, the file designated for transfer to server 150 should be transferred in chunks, memory 110 may hold information pertaining to the file's chunks that have already been transferred from client 100 to server 150. The information, which may be held, for example, in lookup table 115, may include a unique variant of the file name of the file designated for transfer and, in addition, the size of each transferred file's chunk. The information may be used by processor 130 to continue transferring untransferred file's chunks to server 150. Alternatively, processor 130 may retrieve that information from server 150. The way the information is used by client 100 is described herein below.

Client 100 may also include a communication interface 140 to facilitate transfers of files from and to memory 110. Client 100 may use communication interface 140 to transfer files to server 150 via communication link 170 and over a communication network 180 that may be, for example, the Internet. Server 150 may use a communication interface 160 to receive files that are transferred from client 100 and to transfer files to client 100 or to another client (e.g., to client 190). Transfer of files from client 100 to server 150 may be implemented, for example, by using the HTTP protocol.

Processor 130 may designate in memory 110 a relatively large file (e.g., a 5.50 megabyte video clip) for transfer to server 150. In the absence of communication interruptions processor 130 may transfer the designated file to server 150 using one communication session. However, if there are interruptions in the communication link between client 100 and server 150 processor 130 establishes with server 150 additional communication sessions with server 150, during which processor 130 transfers to server 150 chunks of the designated file, one chunk per communication session, by using, for each transferred chunk, a unique variant of the file name of the designated file, as explained above.

The file designated for transfer to server 150 may in and of itself be a distinct content unit, for example it may be a Word file, an MP3 file, a large media file (e.g. an AVI file), etc., or an archive file. If the file designated for transfer to server 150 is or it includes one distinct content unit, each file's chunk may include a different portion of the distinct content. If the file designated for transfer to server 150 is an archive file, each file's chunk may include one or more archived files, or one or more archived files and one or more portions of other archived file(s), or a portion of one or more archived files.

Processor 130 may select in memory 110 k files, designated as $f_1, f_2, \ldots, f_k$, for transfer to server 150, or it may be instructed to do so, for example, by a user of client 100. In the absence of communication interruptions Processor 130 may transfer files $f_1, f_2, \ldots, f_k$ to server 150 over one communication session. However, if there are interruptions in the communication link between client 100 and server 150, Processor 130 establishes with server 150 additional communication sessions with server 150, during which Processor 130 transfers to server 150 portions of the selected file, a portion per communication session, by using, for each communication session, a unique notation of the file name of the selected file.

Files $f_1, f_2, \ldots, f_k$ may be of the same type (e.g., multimedia file). For example, one or more files may be multimedia files, other files may be WORD files, picture files or MP3 files, etc. After processor 130, or a user of client 100, selects the k files for transfer to server 150, processor 130 associates a common file name F with the k selected files. The associated common file name may be chosen arbitrarily, provided that the chosen file name is not already used by the pertinent file system. For example, it can be "myfile" (i.e., F=myfile), "transfer_file" (i.e., F=transfer_file), "exchang_file" (i.e., F=exchang_file), or any other name.

As explained above, client 100 may hold information that pertain, for example, to the file name and file size of each of files $f_1, f_2, \ldots, f_k$, or, alternatively, client 100 may request that information from server 150. As explained above, if a communication session is interrupted before client 100 had a chance to transfer the last file (e.g., $f_k$) to server 150, client 100 can use that information to resume transferring the rest of the files from the point where the communication session was interrupted.

After files $f_1, f_2, \ldots, f_k$ to be transferred to server 150 are selected and the common file name (e.g., myfile) is associated with the selected files, processor 130 establishes a communication session with server 150 and starts transferring the selected files $f_1, f_2, \ldots, f_k$ to server 150 one file after another. The order in which processor 130 transfers the selected files to server 150 (i.e., the transfer order) may be contingent on, or be derived from, the selected files. For example, the transfer order of the selected files may be contingent on the type of the files, or on the size of the files, etc. Alternatively, the transfer order in which processor 130 transfers the selected files to server 150 can be arbitrary.

If the communication session between processor 130 and server 150 is interrupted, processor 130 restores the interrupted communication session with server 150 or establishes therewith a new communication session, depending on whether the communication session was interrupted. Each time the communication session is restored or established processor 130 notates the common file name myfile (an exemplary file name) by using a unique notation and, while the current communication session is uninterrupted, sequentially transfers untransferred files (among the k files $f_1, f_2, \ldots, f_k$) to server 150 by using the uniquely notated common file name. Such communication sessions are restored or reestablished until processor 130 transfers the last untransferred file (e.g., $f_k$) to server 150.

Notating the common file name can be implemented in various ways. For example, if the common file name assigned to, or associated with, the k selected files is "myfile", the file name myfile can be uniquely notated by adding to it some differentiating text or index (e.g., "myfile_1", "myfile_2", myfile_3", and so on) or some file extension (e.g., "myfile.part1", "myfile.part2", myfile.part3", and so on). Even though each file name is unique because of its differentiating index or extension, the file names all share a common file part: the assigned common file name (in this example "myfile"). The common file part is used by client 100 as a filter: (1) to retrieve from server 150 information pertaining to transferred files in order to identify the point in memory 110 from which to resume transfer of other files, and, after all the files have been transferred to server 150, (2) to retrieve the files from server 150.

Figure 1B:
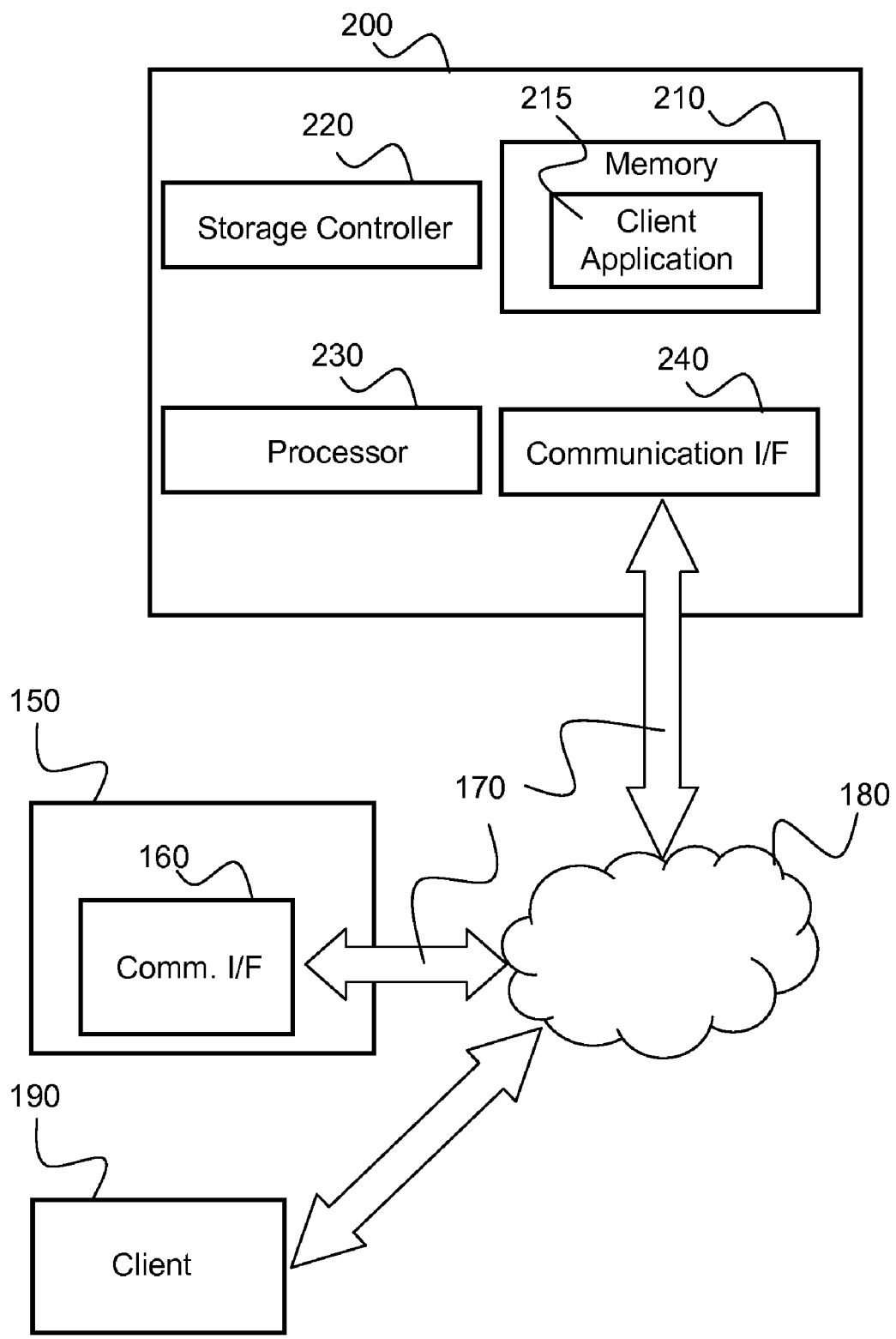
FIG. 1B is a block diagram of a device-server environment according to an example embodiment.

FIG. 1B is a block diagram of a device 200 with a client according to an example embodiment. Device 200 may have all the physical components (e.g., a memory device 210, a storage controller 220, a processor 230 and a communication interface 240) necessary for it to function in a similar way as client 100 of FIG. 1A. Memory 210, storage controller 220, processor 230 and communication interface 240 may respectively be function-wise similar to memory 110, storage controller 120, processor 130 and communication interface 140 of FIG. 1A. Physical components of device 200 may operatively interact with processor 230 and be configured to perform the steps, procedures and method described above, for example in connection with FIG. 1A. In one example, memory device 210 may store a client software application (e.g., "client application" 215) or firmware and be operatively linked to/with processor 230 to cause processor 230 to execute instructions of the client software application to (i) designate a file for transfer to server 150; (ii) establish a communication session between processor 230 and server 150; (iii) transfer the designated file to server 150 by using a unique variant of a file name of the designated file; and (iv) if the communication session between processor 230 and server 150 is interrupted before transfer of the designated file to server 150 is completed, to repeat steps (ii) and (iii) (i.e., establishing a communication session between processor 230 and server 150, and transferring the designated file to server 150 by using a unique variant of a file name of the designated file) as many times as required for processor 230 to complete the file transfer to server 150. The client may be implemented as a special-purpose processor that replaces processor 230.

Figure 2:
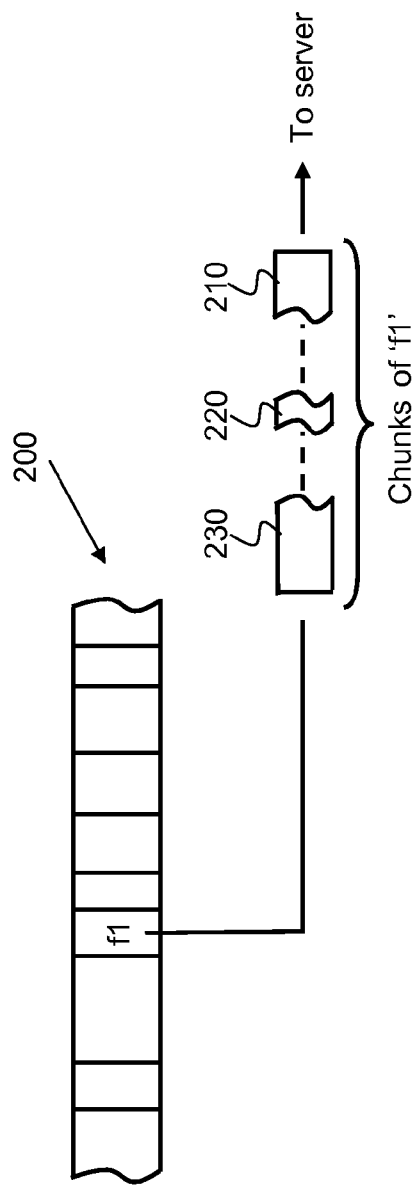
FIG. 2 demonstrates a way for transferring a file from a client to a server according to an example embodiment.

FIG. 2 demonstrates transferring a designated file from a client to a server according to one example embodiment. A file $f_1$ with an exemplary file name DayTrip, which is stored in memory 200, is to be transferred (i.e., it is designated for transfer) from a client to a server. In order to transfer file $f_1$ to the server, a communication session is established between the client and the server and a unique variant of the file name DayTrip (e.g., "DayTrip_P1") is used to transfer file $f_1$. After a first chunk 210 of file $f_1$ is transferred to the server the communication session is assumed to be interrupted. Because file $f_1$ has not been completely transferred to the server, a second communication session is established (or the first/original communication session may be thought of as being reestablished) and a different variant of the file name DayTrip (e.g., "DayTrip_P2") is used to transfer the untransferred part of file $f_1$ to the server.

After a second chunk 220 of file $f_1$ is transferred to the server the communication session is assumed to be interrupted. Because file $f_1$ still has another part that should be transferred to the server, a third communication session is established (or the first/original communication session may be thought of as being reestablished) and a different variant of the file name DayTrip (e.g., "DayTrip_P3") is used to transfer the untransferred part of file $f_1$ to the server. It is assumed that transferring file $f_1$ requires three communication sessions, which results in the designated file $f_1$ being transferred to the server in three chunks (i.e., chunks 210, 220, and 230).

As explained above, the number of chunks that are transferred to the server equals to the number of the communication sessions required for a complete transfer of the involved file, and the size of each chunk depends on the duration of the associated communication session. The (common) file name used to transfer file $f_1$ to the server can be the original file name (e.g., "DayTrip") of filed $f_1$. Alternatively, file $f_1$ may be transferred to the server by using a file name other than the file's original name. For example, the file name "TransFile" may be used instead of the file's original name DayTrip. The file name used to transfer the designated file to the server may be chosen randomly.

Figure 3:
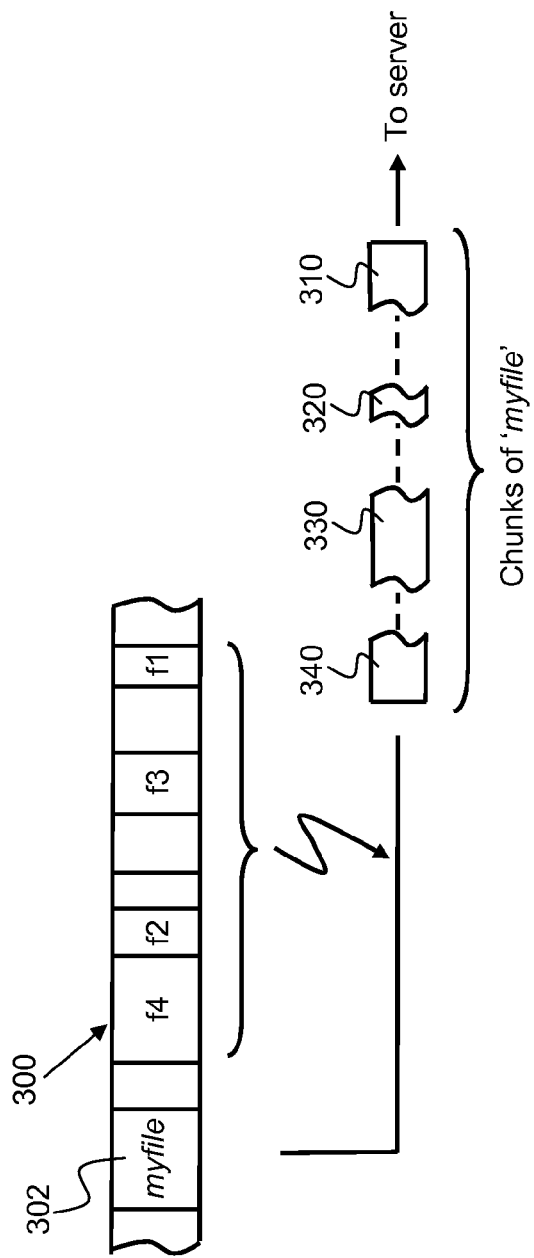
FIG. 3 demonstrates a way for transferring files from a client to a server according to another example embodiment.

FIG. 3 demonstrates transferring a designated file from a client to a server according to another example embodiment. Files $f_1, f_2, \ldots, f_3$ and $f_4$, which are stored in memory 300, are to be transferred from a client to a server. In order to transfer files $f_1, f_2, f_3, f_4$ to the server a common file name (e.g., "myfile", shown at 302) is assigned to them (i.e., a file called myfile is designated for transfer). By "assigned to them" is meant that different variants of the common file name myfile will be used to transfer different chunks of the designated file myfile, where the number of variants of the common file name matches the number of chunks which depends on the number of communication interruptions. After the common file name myfile is assigned to files $f_1, f_2, f_3, f_4$, the files $f_1, f_2, f_3, f_4$ are transferred to the server, one file after another, by using unique variants of the common file name myfile, as described below.

In order to transfer files $f_1, f_2, f_3, f_4$ to the server, a first communication session is established between the client and the server and the files $f_1, f_2, f_3, f_4$ are started to be transferred to the server, on file after another, by using a unique variant of the designated file myfile is (e.g., "myfile.Chunk1"). After a first chunk 310 of the designated file myfile is transferred to the server the communication session is assumed to be interrupted. It is assumed that the first two files $f_1, f_2$ were completely transferred to the server within or as part of chunk 310 and that files $f_3, f_4$ still need to be transferred. Therefore, a second communication session is established (or the first/original communication session may be thought of as being reestablished) and a different variant of the file name myfile (e.g., "myfile Chunk2") is used to transfer the rest of the files (i.e., files $f_3$, $f_4$) to the server.

After a second chunk 320 of the designated file myfile is transferred to the server the communication session is assumed to be interrupted. It is assumed that the file $f_3$ was completely transferred to the server within or as part of chunk 330 and that file $f_4$ still needs to be transferred. Therefore, a third communication session is established and a different variant of the file name myfile (e.g., "myfile Chunk3") is used to transfer file $f_4$ to the server.

After a third chunk 330 of the designated file myfile is transferred to the server the communication session is assumed to be interrupted. It is assumed that the communication interruption occurred during transfer of file $f_4$, which means that chunk 330 includes only part of file $f_4$. Therefore, a fourth communication session is established and a different variant of the file name myfile (e.g., "myfile Chunk4") is used to transfer the rest of file $f_4$ to the server. Alternatively, in order to ensure error-free communication of a particular file that was partly transferred to the server, the entire particular file, whose transfer to the server was interrupted, may be sent to the server. Referring to FIG. 3, the entire file $f_4$ may be transferred to the server as part of chunk 340 or only the part thereof which was not transferred as part of any of the previous chunks 310, 320 and 330.

Referring to FIG. 2 the designated file $f_1$ may include one distinct content unit, in which case chunks 210, 220 and 230 would be chunks of a larger file that may in and of itself be a Microsoft Word file, an MP3 file, an archive file or a large media file (e.g. an AVI file). Referring to FIG. 3 the designated file $f_1$ may include non-archived files. For example it may include three distinct, non-archived, content units: one Microsoft Word file, one MP3 file and one Microsoft Excel file.

Figure 4:
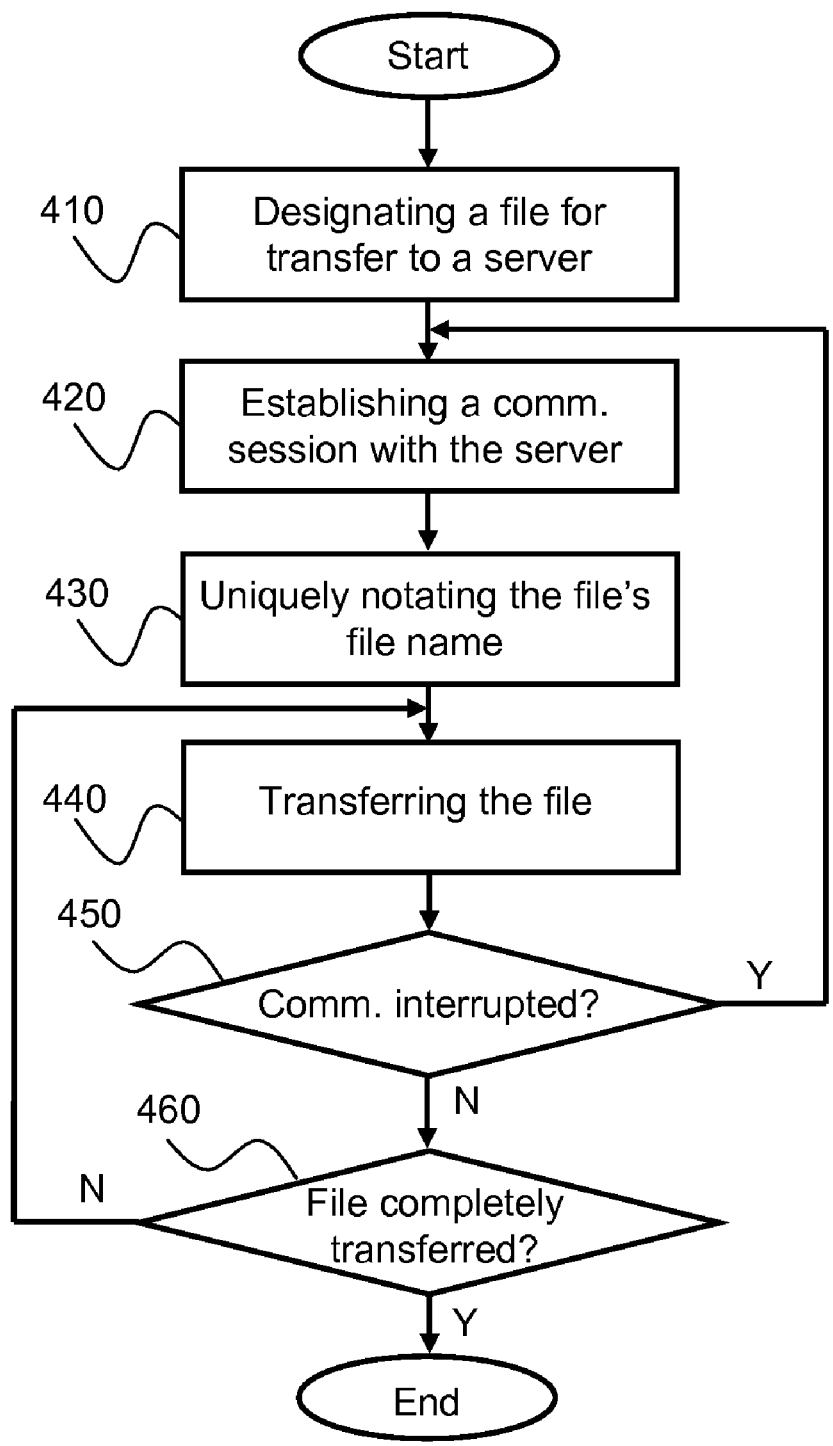
FIG. 4 is a method for transferring a file from a client to a server according to an example embodiment.

FIG. 4 is a method for transferring a file from a client to a server according to an example embodiment. FIG. 4 will be described in association with FIG. 1A. At step 410, processor 130 designates a file for transfer to server 150. At step 420, processor 130 establishes a communication session with server 150. At step 430, processor 130 uniquely notates the file name of the designated file to thereby make a unique variant of designated file's name. At step 440 processor 130 starts to transfer the designated file to server 150 by using the unique variant of designated file's name.

At step 450 processor 130 checks whether the current communication session is interrupted. If the current communication session is not interrupted (shown as "N" at step 450), then at step 460 processor 130 checks whether transferring the designated file to server 150 is completed. If transfer of the designated file is not completed (shown as "N" at step 460), transfer of the designated file continues in a regular manner as long as the current communication session is uninterrupted. If transfer of the designated file to server 150 is completed (shown as "Y" at step 460) without any communication interruptions in the current communication session, processor 130 terminates the file transfer process after using only one communication session. However, if the current communication session is interrupted before transfer of the designated file is completed (shown as "Y" at step 450), processor 130 establishes, at step 420, a second communication session and iterates steps 430, 440, 450 and 460 until transfer of the designated file to server is completed.

Figure 5:
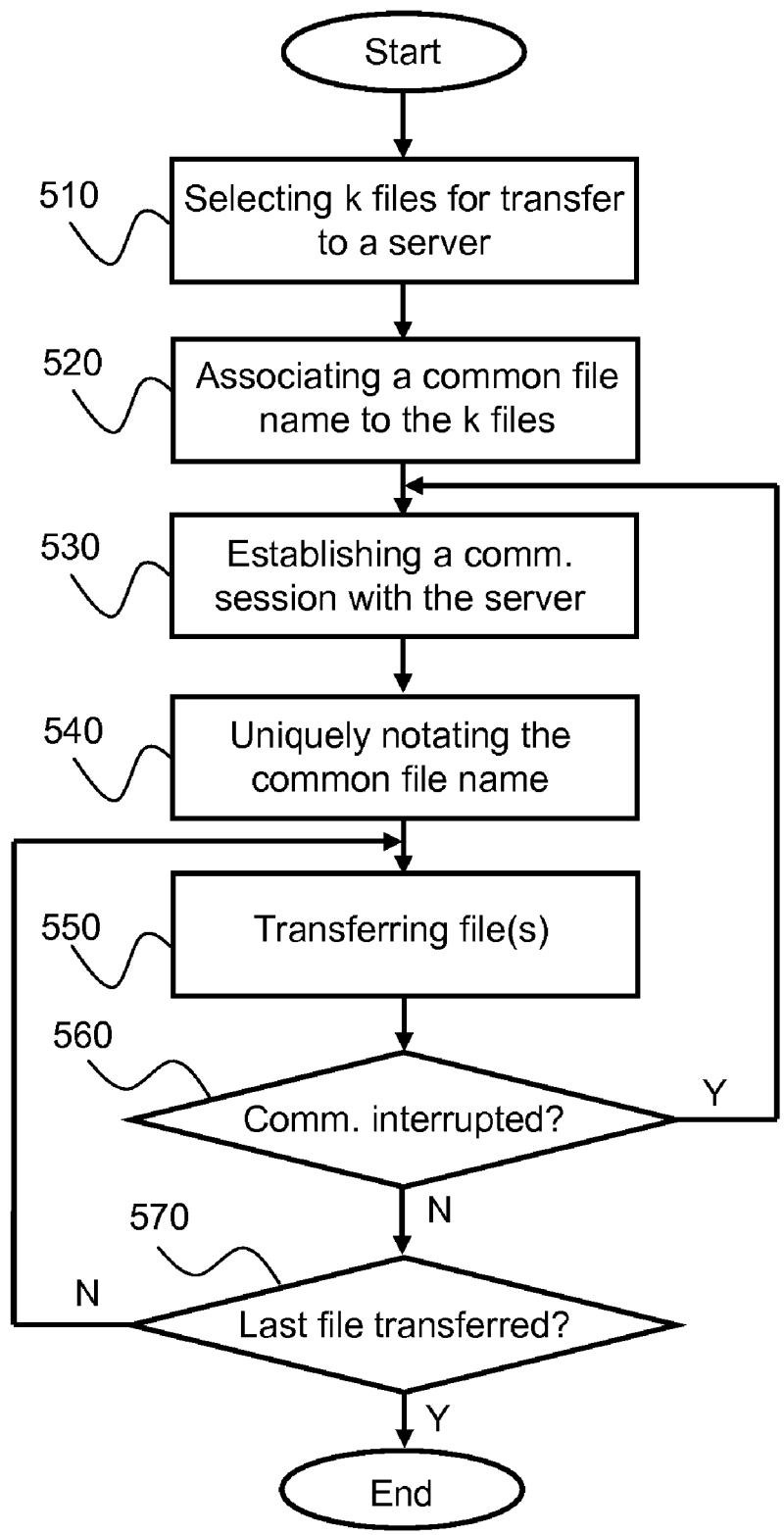
FIG. 5 is a method for transferring files from a client to a server according to another example embodiment.

FIG. 5 is a method for transferring files from a client to a server according to another example embodiment. FIG. 5 will be described in association with FIG. 1A. At step 510, processor 130 selects k files $f_1, f_2, \ldots, f_k$ for transfer to server 150. At step 520 processor 130 associates, or assigns, a common file name, for example "archive_file", to the k selected files $f_1, f_2, \ldots, f_k$. At step 530, processor 130 establishes a communication session with server 150.

At step 540, processor 130 uniquely notates the common file name archive_file and prepares to transfer to server 150 files $f_1, f_2, \ldots, f_k$. At this stage the communication session established between processor 130 and server 150 is the first communication session and processor 130 notates the common file name archive_file by adding, for example, the file extension "part1" to the common file name. If the first communication session is not interrupted at least until all files $f_1, f_2, \ldots, f_k$ are transferred to server 150, the files' transfer process requires one communication sessions. If, however, the communication session is interrupted before all files $f_1, f_2, \ldots, f_k$ are transferred to server 150, an additional communication session would be required during which transfer of files $f_1, f_2, \ldots, f_k$ will continue substantially from the point where the first communication session was interrupted. If, for example, the i (e.g., first) communication session was interrupted in the middle of the transfer of file $f_3$, the transfer of the files will continue during the i+1 (e.g., second) communication session by completing the transfer of file $f_3$, and then by transferring the rest of the files.

At step 550 processor 130 notifies server 150 of the first notated file name (e.g., archive_file.part1). Responsive to receiving the first notated file name server 150 (i) prepares for storing whatever files processor 130 intends to transfer to server 150, and (ii) acknowledges to processor 130 receipt of the first notated file name. Responsive to receiving the acknowledgement from server 150, processor 130 uses the first notated file name archive_file.part1 to transfer to server 150 as many files among files $f_1, f_2, \ldots, f_k$ as possible. As long as the first communication session is free of interruptions (shown as "N" at step 560) and the last file has not yet been transferred (shown as "N" at step 570), processor 130 continues to transfer to server 150 one file after another during the first communication session. If the first communication session is long enough, processor 130 transfers to server 150 all the files $f_1, f_2, \ldots, f_k$ in the first (and only) communication session. However, if the first communication session is interrupted (shown as "Y" at step 560) before all the files $f_1, f_2, \ldots, f_k$ are transferred to server 150, then at step 530 processor 130 establishes a second communication session.

At step 540, processor 130 uniquely notates the common file name archive_file and prepares to transfer to server 150 the rest of the files $f_1, f_2, \ldots, f_k$. At this stage the communication session established between processor 130 and server 150 is the second communication session. Therefore, processor 130 may notate the common file name archive_file by adding, for example, the file extension "part2" to the common file name archive_file.

At step 550 processor 130 notifies server 150 of the second notated file name (e.g., archive_file.part2). Responsive to receiving the second notated file name server 150 (i) prepares for storing whatever file(s) processor 130 intends to send to server 150, and (ii) acknowledges to processor 130 receipt of the second notated file name. Responsive to receiving the acknowledgement from server 150 processor 130 uses the second notated file name archive_file.part2 to transfer to server 150 as many untransferred files among files $f_1, f_2, \ldots, f_k$ as possible (i.e., until the communication session is interrupted). As long as the second communication session is free of interruptions (shown as "N" at step 560) and the last file has not yet been transferred (shown as "N" at step 570), processor 130 continues to transfer to server 150 one untransferred file after another during the second communication session. If the second communication session is long enough, processor 130 transfers to server 150 all the rest of the untrenasferred files among files $f_1, f_2, \ldots, f_k$ in the second communication session. However, if the second communication session is interrupted (shown as "Y" at step 560) before all the rest of the untransferred files are transferred to server 150, then at step 530 processor 130 establishes a third communication session. During the third communication session processor 130 transfers additional untransferred files to server 150 and if transfer of the untransferred files is interrupted one or more times processor 130 may use additional one or more communication sessions to transfer more files by repeating steps 530 through 570.

If a communication session is not interrupted (shown as "N" at step 560), processor 130 checks, at step 570, whether the file currently transferred to server 150 is the last file to be transferred. If it is the last file to be transferred file, processor 130 completes its transfer and terminates the files' transfer process. However, if the file currently transferred to server 150 is not the last file to be transferred, processor 130 continues to transfer that file and, for as long as the current communication session is still intact, also the other files.

As explained above, a communication session may be interrupted before processor 130 completes the transfer of a particular file. For example, the communication session may be interrupted during the transfer of file $f_1$ or after processor 130 transfers the first three files (e.g., $f_1, f_3, f_8$) to server 150. Processor 130 "knows" which files are yet to be transferred to server 150 (i) by receiving, from server 150, information pertaining to files (e.g., file names and file sizes) that have already been transferred to server 150, or (ii) by maintaining the information in lookup table 115 in client 100.

If a communication session is interrupted in the middle of the transfer of a particular file, there is a risk that the portion of the file that was transferred to server 150 may be corrupted. In order to ensure error-free communication of a file to a server, the suspected portion of the file may be discarded and the entire file may be retransferred to server 150 during one of the following communication sessions.

When the first communication session is established, processor 130 may forward to server 150 the common file name itself (e.g., myfile) rather than the first notated file name. This way, if all the files $f_1, f_2, \ldots, f_k$ are transferred to server 150 in one communication session, neither processor 130 nor server 150 have to deal with files that have been uniquely notated. If the common file name itself is used to transfer the first chunk of file(s) and the first communication session is interrupted, processor 130 may continue to transfer the rest of the files by using notated common file name(s).

As explained above, the steps of reestablishing a communication session and transferring more files during the reestablished communication sessions may need to be repeated. For file(s) transferring purpose client 100 may use a flag to indicate to a retrieving client whether or not all the files $f_1, f_2, \ldots, f_k$ have been transferred to server 150. For example, a flag called "FLAG" may be set to some repeating value (e.g., "1" or "Transfer") before the first file of the files $f_1, f_2, \ldots, f_k$ is transferred to server 150, and to some non-repeating value (e.g., "0" or "End-of-Transfer") after the last file of the files $f_1, f_2, \ldots, f_k$ is transferred to server 150. The "retrieving client" may be client 100 or any other client, for example remote client 190. Client 100 may send a corresponding URL link to remote client 190 and remote client 190 may use that link to retrieve file $f_1, f_2, \ldots, f_k$ from server 150.

For retrieving purpose, server 150 may create a meta-file that automatically combines (i.e., concatenates) all the notated files. In order for a client (e.g., client 100) to retrieve the notated files from server 150 the client has to request the meta-file from server 150, which will result in server 150 sequentially sending all the notated files to the client in one batch.

Figure 6:
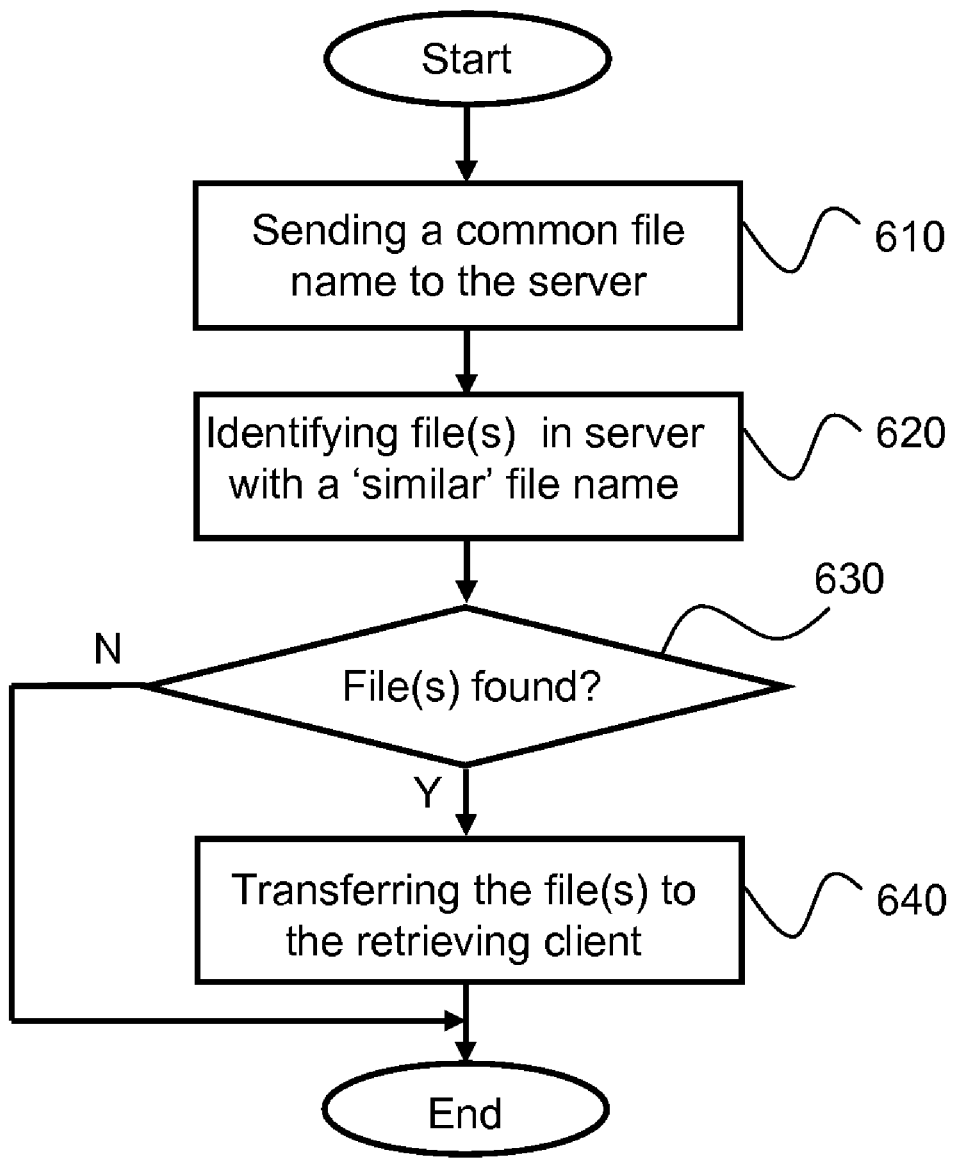
FIG. 6 is a method for retrieving file(s) from a server according to an example embodiment.

FIG. 6 is a method for retrieving files from a server according to an example embodiment. It is assumed that a server stored files that are name-wise related (i.e., their file names are unique variants of a common file name). At step 610 a retrieving client sends the common file name to the server. At step 620 the server uses the common file name to seek search for the name-wise related files associated with the common file name. At step 630 it is checked whether such name-wise related files exist. If the server does not find such files (shown as "N" at step 630) the file-retrieving process is terminated. If the server finds such files (shown as "Y" at step 630) the server transfers the files that it found to the retrieving (i.e., requesting) client.

Figure 7:
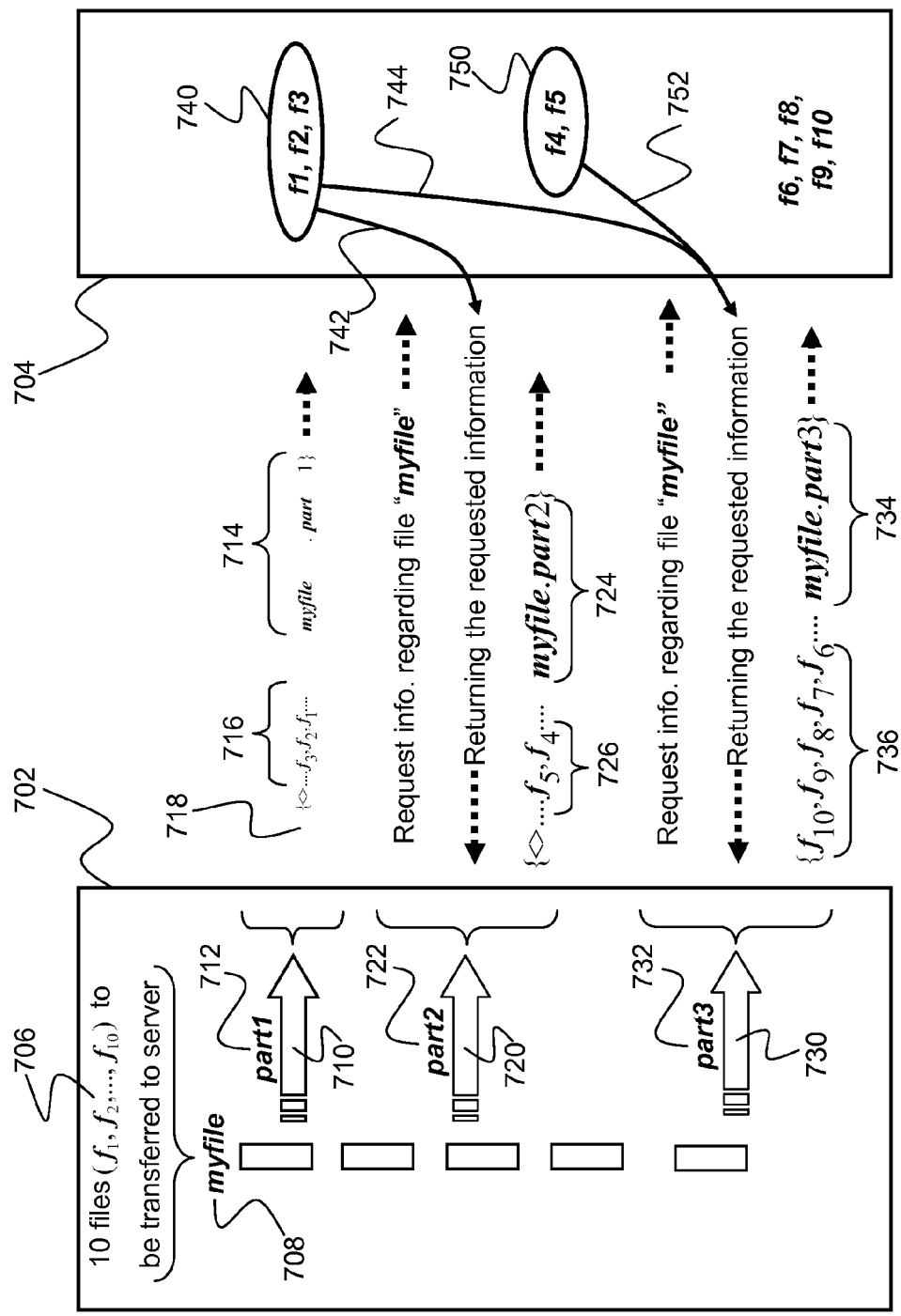
FIG. 7 demonstrates a way for transferring files from a client to a server according to an example embodiment.

FIG. 7 demonstrates exchanging data between a client 702 and a server 704 according to an example embodiment. Client 702 and server 704 operate in a similar manner as client 100 and server 150 of FIG. 1A, respectively. Client 702 has ten files $f_1, f_2, \ldots, f_{10}$ (shown at 706) that have to be transferred to server 704. Client 702 will use the common file name "myfile" (shown at 708) to transfer files $f_1, f_2, \ldots, f_{10}$ to server 704 in the way described below. As explained above, it may be said that file "myfile" is designated by client 702 for transfer to server 704.

In order for client 702 to send ten files 706 to server 704, client 702 uniquely notates the common file name myfile (i.e., it prepares a unique variant of the common file name) by using a first notation "part1" 712. Client 702, then, sends the file name myfile.part1 (shown at 714) to server 704. Then, while first communication session 710 continues uninterruptedly, client 702 starts transferring files 706 one file after another. In this example client 702 has transferred to server 704 during first communication session 710 three files $f_1, f_2, f_3$ (shown at 716), after which first communication session 710 was interrupted (the interruption being symbolically shown at 71.8). Because files $f_4$ through $f_{10}$ have not been transferred to server 704 during first communication session 710 client 702 establishes a second communication session 720 with server 704.

During second communication session 720 client 702 requests information that pertains to all the files that have been transferred during the previous one or more communication sessions (in this case during first communication session 710). In order to receive that information, client 702 inquires server 704 whether it holds files whose file name includes the common file name myfile. At this stage server 704 holds one such file (i.e., file myfile.part1). Therefore, responsive to the inquiry, server 704 returns (shown at 742) to client 302 information pertaining to files 740 that were transferred to server 704 by using file name myfile.part1. Client 702, then, uses that information, which includes the name and bit-wise size of each of files $f_1, f_2, f_3$, to calculate an offset value. Client 702, then, uses the offset value to determine the next point in the memory where files 706 are stored, from which client 702 should resume transferring to server 704 the rest of files 706.

In order for client 702 to send the rest of files 706 to server 704 during second communication session 720, client 702 uniquely notates common file name myfile 708 by using a second notation "part2" 722. Client 702, then, sends the second notated file name myfile.part2 (shown at 724) to server 704. Then, while second communication session 720 continues uninterruptedly, client 702 resumes transferring the rest of the files 706 to server 704, one file after another. In this example client 702 has successfully transferred to server 704, during second communication session 720, files $f_4$ and $f_5$ (shown at 726), after which second communication session 720 was interrupted.

Because client 702 has not transferred files $f_6$ through $f_{10}$ to server 704 during first communication session 710 and second communication session 720 (due to communication failure), client 702 establishes a third communication session 730 with server 704 in order to transfer to server 704 the untransferred files.

During third communication session 730 client 702 requests information that pertains to all the files that have been transferred during the previous one or more communication sessions (in this case during first communication session 710 and second communication session 720). In order to receive that information, client 702 inquires server 704 whether it holds files whose file names include the common file name myfile. At this stage server 704 holds two such files: file myfile.part1 and file myfile.part2. Therefore, responsive to the inquiry (i.e., responsive to the transfer of the common file name myfile to server 704) server 704 returns to client 702 information pertaining to files 740 that were transferred to server 704 by using file name myfile.part1 (transfer of the information pertaining to files 740 is shown at 744), and, in addition, information pertaining to files 750 that were transferred to server 704 by using file name myfile.part2 (transfer of the information pertaining to files 750 is shown at 752). Client 702, then, uses that information, which may include, for example, the name and size of each of files $f_1$, $f_2$, $f_3$, $f_4$, $f_5$, to calculate a new offset value. Client 702, then, uses the new offset value to determine the next point in the memory where files 706 are stored, from which client 702 should resume transferring to server 704 the rest of files 706.

In order for client 702 to send the rest of files 706 to server 704 during third communication session 730, client 702 uniquely notates common file name myfile 708 by using a third notation "part3" 732. Client 702, then, sends the notated file name myfile.Part3 (shown at 734) to server 704. Then, while third communication session 730 continues uninterruptedly, client 702 resumes transferring the rest of files 706 to server 704 one file after another. In this example client 702 has managed to transfer to server 704, during third communication session 730, files $f_6$ through $f_{10}$ (shown at 736), after which communication session 730 may be terminated by client 702 in an orderly fashion if there is nothing else that needs to be communicated from client 702 to server 704 or from server 704 to client 702. As explained above, instead of requesting from server 704 the information that pertains to transferred files, client 702 may hold the information, for example, in a lookup table similar to lookup table 115 of FIG. 1A.

While files 706 are stored in server 704, a user of client 702 can manually request the file myfile from a different client, for example by using a Uniform Resource Locator ("URL"). For example, the user can use the HTTP command "PUT" to send, for example, a file http://www.myserver.com/myfile.xyz to server 704, and then send a link (e.g., "Get_this_file") to this URL to a second user. Then the second user can use the same URL (i.e., "Get_this_file") from anywhere to retrieve every file that was send to server 704 by using the common file name myfile (i.e., by using the designated file myfile).

Figure 8:
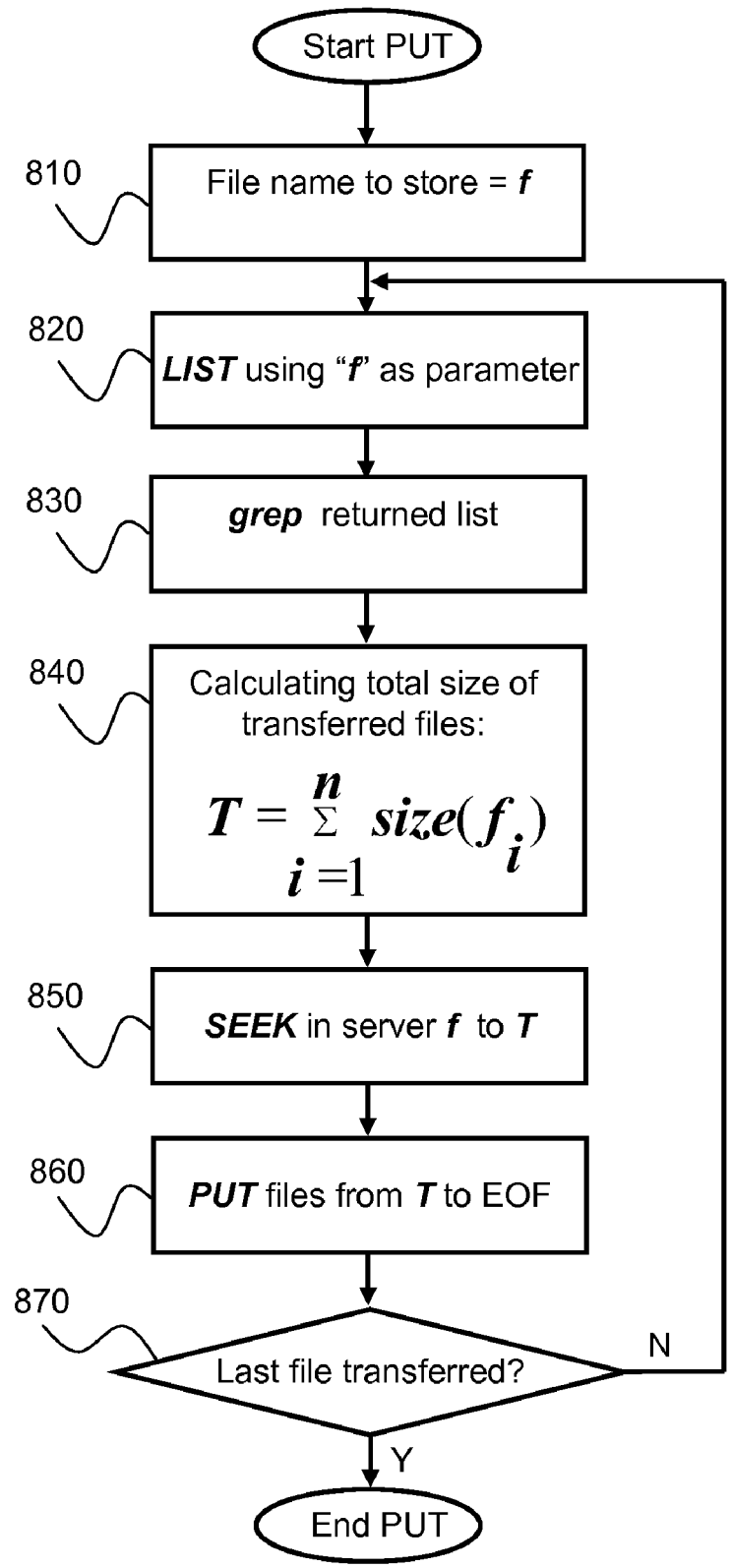
FIG. 8 is a method for using the HTTP protocol to transfer files from a client to a server according to an example embodiment.

FIG. 8 is a method of using the HTTP protocol to transfer files from a client to a server according to an example embodiment. FIG. 8 will be described in association with FIG. 7. With respect to the HTTP protocol, "GET" is a command requesting a representation of a specified resource; "PUT" is a command for uploading a representation of the specified resource, and "LIST" is a command used to obtain a list of file names based on some filter value. In the context of the present disclosure the LIST command may include a common file name as a filter value (i.e., as an argument) "grep" is a command triggering a searching mechanism for searching for a specific string of characters or a specific text pattern in a file or in a file name. "grep" is a POSIX command, an equivalent of which is found in typical server operating systems. "POSIX", which stands for "Portable Operating System Interface", is a collective name of a family of standards specified by the IEEE to define the application programming interface (API). Depending on the degree of compliance with the standards, operating systems can be fully or partly POSIX compatible.

At step 810, client 702 notifies server 704 that it intends to store a file f in server 704. File 'f' is a common file name of a file designated for transfer to the server. At step 820, client 702 sends a "LIST" command with file name f as a filter value to server 704 in order to know whether files are stored in server 704 which are name-wise related to the filter value, which, in this example, is the common file name f.

At step 830 client 702 applies a grep command on the output of the LIST command to identify the files currently present in server 704 whose file names match the file f.p pattern, where 'f' designates the common file name used to store the files in server 704 and 'p' designates a template extension used to denote the various files (e.g., myfile.1, myfile.2, etc.). In other words, by using the grep command client 702 receives the names of all the files in server 704 whose file name includes the common file name f and, in addition, the size of each of these files.

At step 840 client 702 uses the file sizes it receives from server 704 to calculate the total size T of these files. Client 702 uses, at step 850, the value of T as an offset value by which client 702 seeks (e.g., in its memory) the next "chain" of files that are yet to be sent to server 704, or the point in the memory of or associated with client 702 from which client 702 should resume transferring the rest of the file(s).

At step 860 client 702 PUTs the rest of the files in server 704, starting from the offset point T onwards. The PUT process is orderly terminated with the conclusion of the PUT command, but if the PUT command fails in the middle, the PUT process may be restarted. At step 870 it is checked whether the last file was transferred from client 702 to server 704. If the last file to be transferred to server 704 has not been transferred (shown as "N" at step 870), a new communication session is commenced, during which communication session steps 820 through 860 are repeated. After the last file is transferred to server 704 (shown as "Y" at step 870), the PUT process is terminated.

Figure 9:
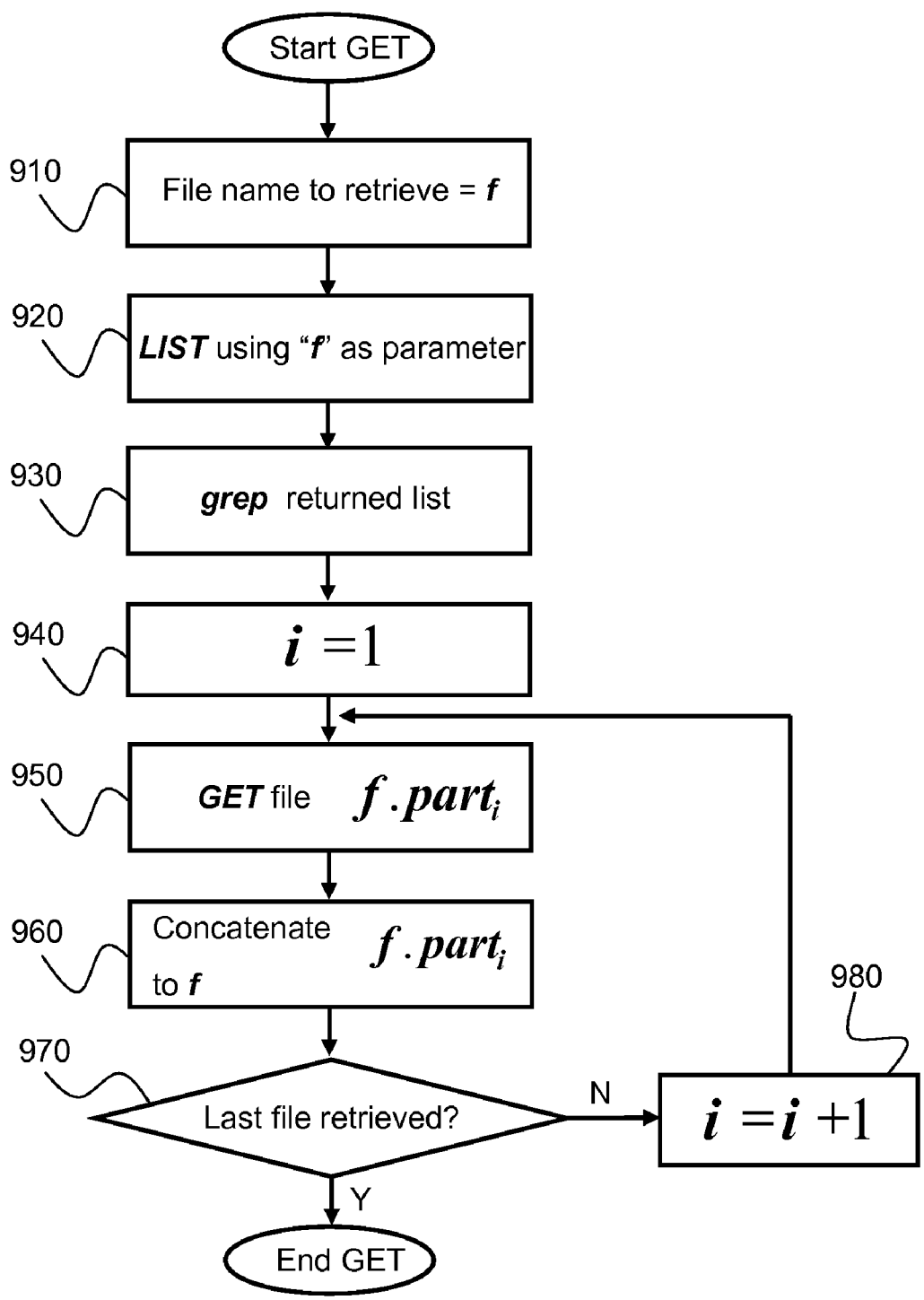
FIG. 9 is a method for using the HTTP protocol to retrieve files from a server according to an example embodiment.

FIG. 9 is a method of using the HTTP protocol to retrieve files from a server according to an example embodiment. FIG. 9 will be described in association with FIG. 7.

At step 910, client 702 sends to server 704 the common file name f for retrieving every notated file that includes the common filename. At step 920, client 702 executes a LIST command against server 704 with the common file name f as a parameter. At step 930, client 702 applies the grep command on the list of file names it receives from server 704. At step 940 an index i is initialized. At step 950 client 702 GETs (i.e., retrieves) from server 704 the first notated file (i.e., file $f.part_1$), which includes one or more files that were stored in server 704 by client 702 during a corresponding PUT process. At step 960, client 702 concatenates the first notated file f.part$_1$ to file f.

At step 970 it is checked whether there are more notated files f.part$_i$ (i>1) that should likewise be retrieved. If there is at least one more such file (i.e., file f.part$_i$) (shown as "N" at step 970), then at step 980 index i is incremented by one, and, at step 950, client 702 GETs the second notated file f.part$_2$, which includes other files that were stored in server 704 by client 702 during a corresponding PUT process. Then, at step 960 client 702 concatenates the second notated file f.part$_2$ to file f, which, after the second concatenation, contains two notated files: f.part$_1$ and f.part$_2$. Assuming there are n notated files (i.e., files f.part$_1$ through f.part$_n$), steps 950 and 960 are repeated until client 702 GETs the last notated file f.part$_n$. As explained above, each notated file f.part$_i$ that client 702 receives from server 704 contains one or more files that client 702 transferred to server 704 during the corresponding communication session (i.e., during the corresponding PUT process). By retrieving all the n notated files (i.e., files f.part$_1$, f.part$_i$, . . . , f.part$_n$) client 702 receives from server 704 every file that was transferred to server 704 by using a common file name. As explained above, files may be stored in a server by one client and retrieved from the server by the same client or another client.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, fewer modules and/or functionally equivalent modules.

What is claimed is:

1. A method for transferring data from a client to a server, the method comprising:
   by a client:
   designating a file for transfer to a server;
   establishing a communication session between the client and the server;
   starting the transfer of the file to the server, wherein the file is transferred using a first variant of a file name of the file; and
   when the communication session is interrupted after a first portion of the file is transferred to the server and before transfer of the file to the server is completed:
     identifying a second portion of the file that has not been transferred to the server when the communication session is interrupted;
     assigning a second variant of the file name of the file to the second portion of the file, wherein each of the first variant of the file name and the second variant of the file name includes a unique sequential identifier that includes an alphabetical, numeric, or alphanumeric index, and wherein the unique sequential identifier of the second variant of the file name is sequentially related to the unique sequential identifier of the first variant of the file name; and
     starting transfer of the second portion of the file to the server using the second variant of the file name.

2. The method as in claim 1, wherein each of the first variant of the file name and the second variant of the file name includes a unique suffix, prefix, or file extension to the file name.

3. The method as in claim 1, further comprising using information indicating what portion of the file is successfully transferred to the server to identify an offset from which transfer of the rest of the file should continue.

4. The method as in claim 3, wherein the client retrieves the information from the server.

5. The method as in claim 3, wherein the information is maintained and updated by the client.

6. The method as in claim 3, wherein the information includes a size of each part of the file that is transferred to the server, and wherein the offset is derived from the size of each part of the file that is successfully transferred to the server.

7. The method as in claim 6, wherein the offset is the sum of the size of each part of the file that is successfully transferred to the server excluding the size of a part that was transferred to the server during a previous communication session.

8. The method as in claim 1, further comprising assigning to a flag at the server a repeating value to indicate when transferring the file to the server is not completed and assigning to the flag a non-repeating value to indicate to the client when transferring the file to the server is completed.

9. The method as in claim 8, wherein the flag is assigned the repeating value before or during a first communication session, and wherein the flag is assigned the non-repeating value after transfer of the file to the server is completed.

10. The method as in claim 1, wherein the file transferred to the server includes k sub-files $f_1, f_2, \ldots, f_k$ (where $1 \leq k \leq n$).

11. The method as in claim 10, wherein if a communication session is interrupted during transfer of a particular one of the k sub-files, the particular one of the k sub-files is retransferred during a consecutive communication session.

12. The method as in claim 10, further comprising:
   sequentially retrieving one of the k sub-files from the server responsive to transferring a file name of one of the k sub-files to the server.

13. The method as in claim 10, further comprising subsequent to the client requesting the file from the server, receiving the k sub-files in the file from the server as one concatenated file.

14. The method as in claim 1, wherein the file is transferred from the client to the server by using Hypertext Transfer Protocol.

15. A device configured to operate as a client for transfer of one or more files to a server, comprising:
   a processor; and
   a memory device storing a client software application, the memory device being operatively linked with the processor,
   wherein the processor is configured to execute instructions of the client software application to:
     designate a file for transfer to a server;
     establish a communication session between the processor and the server;
     start transfer of the file to the server; and
     if the communication session is interrupted one or more times before transfer of the file to the server is completed, transfer each successive portion of the file that is determined not to be successfully transferred to the server at a time when the communication session is interrupted, wherein each successive portion of the file is assigned a unique variant of a file name of the file and transferred to the server using the unique variant of the file name of the file until the transfer of the file to the server is completed, wherein each unique variant of the file name includes a unique sequential identifier that includes an alphabetical, numeric, or alphanumeric index, and wherein the unique sequential identifier of each successive portion of the file is sequentially related to the unique sequential identifier of a preceding portion of the file.

16. The device as in claim 15, wherein the processor is further configured to use information indicating what portion of the file is successfully transferred to the server to identify an offset from which transfer of the rest of the file should continue.

17. The device as in claim 16, wherein the processor is configured to retrieve the information from the server.

18. The device as in claim 16, wherein the processor is configured to maintain and update the information.

19. The device as in claim 16, wherein the information includes a size of each part of the file that is transferred to the server, and wherein the offset is derived from the size of each part of the file that is successfully transferred to the server.

20. The device as in claim 15, wherein each unique variant of the file name includes the unique sequential identifier in a suffix to the file name, in a prefix to the file name, or in a file extension to the file name.

* * * * *